(No Model.)
H. W. GRAY.
NUT LOCK.
No. 465,848. Patented Dec. 29, 1891.
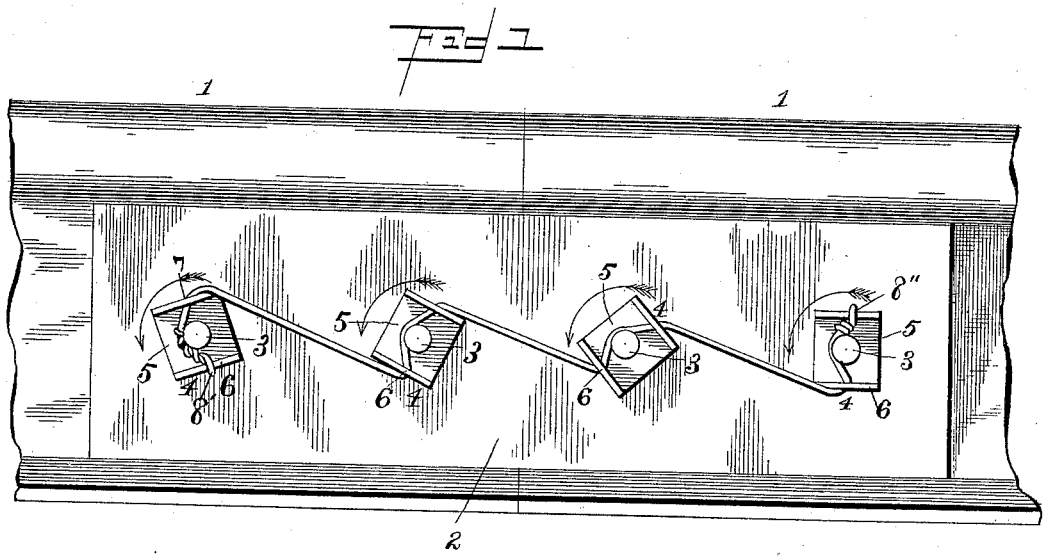
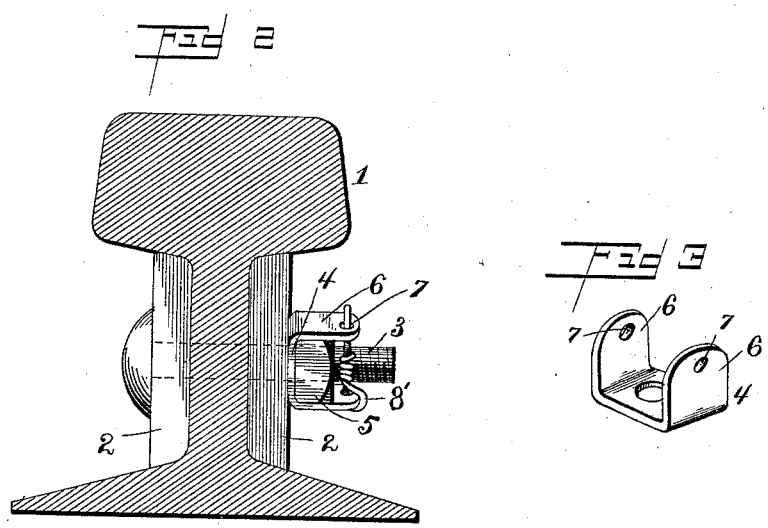
Witnesses:
Chas. F. Miller
L. J. Higdon
Inventor:
H. W. Gray
By his Attorneys
Higdon & Higdon

UNITED STATES PATENT OFFICE.

HIRAM W. GRAY, OF LITTLE ROCK, ARKANSAS.

NUT-LOCK.

SPECIFICATION forming part of Letters Patent No. 465,848, dated December 29, 1891.

Application filed September 1, 1891. Serial No. 404,397. (No model.)

*To all whom it may concern:*

Be it known that I, HIRAM W. GRAY, a citizen of the United States, residing at Little Rock, in the county of Pulaski and State of Arkansas, have invented certain new and useful Improvements in Nut-Locks; and I do hereby declare the following to be a full, clear, and exact description of the invention, such as will enable others skilled in the art to which it appertains to make and use the same.

My invention relates to certain new and useful improvements in nut-locks; and it is especially adapted for use in situations where two or more bolts are arranged contiguous to each other, such as in the joints of railroad-rails, and I will therefore proceed to describe it as applied for securing the nuts in such a joint, although it is obvious that it may be applied to other purposes.

My invention consists of a peculiar manner of connecting the contiguous nuts, so that a rotation of any one of them is prevented; and it more especially consists in the construction, combination, and arrangement of the parts of which it is composed, as will be hereinafter more fully described and claimed.

Referring to the accompanying drawings, in which corresponding parts are designated by similar figures, Figure 1 is a side elevation of my invention applied to a railroad-track. Fig. 2 is an end elevation thereof. Fig. 3 is a detail view of the washer.

1 1 indicates the end of two adjoining track-rails which are contained between the fish-plates 2 2, the whole structure being bound together by the bolts 3, as is usual. A washer 4 is inserted between each of the nuts 5 on the bolts 3 and the fish-plate, each of the said washers having its opposite side ears 6 bent up at right angles and perforated, as at 7, the two ears 6 forming between them a seat for the nut corresponding thereto. As will be seen from an inspection of the drawings, the nuts are contained within these seats, two of the opposite sides of the nuts bearing against the inner surfaces of the ears 6, thus necessitating that each washer and nut contained therein be rotated together. It can now be readily understood that as the washers are prevented from rotating by the wire 8 the nuts will be locked against becoming loose.

The manner of applying the wire is as follows: The nuts having been placed in the proper position within the ears of the washers, the wire 8 has its one end secured, as at 8', to the lower ear of the washer on the left-hand bolt, the wire being then passed upward and around the end of the bolt and through the perforation 7 of the opposite ear of the same washer, from which it is brought down and passed through the perforation 7 in the lower ear of the washer on the adjoining bolt, from which it is brought around the end of the said bolt and through the perforation in the opposite ear of the washer, as before, and this may be continued until the last bolt is reached, when the opposite end of the wire should be secured to the upper ear of the washer thereon, as at 8''. In consequence of this construction an unlocking rotation of the nuts and washers is prevented, as it will be readily seen that a rotation of any of the washers in the direction indicated by the arrows (which is an unlocking rotation) would necessitate the tightening of the nut carried by the next washer; but as the latter nut is tightened as much as possible when first screwed on, it cannot be further tightened and consequently the nut before it cannot loosen. The wire being stretched tight between the ears of each washer and engaging the threads of the bolts, it will be seen that the friction between the wire and bolts will still further aid in holding the washers firm.

Having thus described my invention, what I claim is—

1. In a nut-lock for nuts upon a plurality of bolts, the combination, with a washer mounted upon each bolt and having two of its opposite sides bent upward and perforated, of a nut mounted upon each bolt and contained within the bent-up ends of the washer thereon, and a wire passing through the perforations in the opposite sides of each of the said washers and having its inner ends connected with the washers upon the end bolts, substantially as described.

2. In a nut-lock for nuts upon a plurality of bolts, the combination, with a washer mounted upon each bolt and having two of its opposite sides bent upward and perforated, of a nut mounted upon each bolt and contained within the bent-up ends of the washer thereon, and a wire passing through the perforation in the lower ear of each washer, thence passing around the bolt in contact
5 with the threads thereof and through the perforation in the upper ear and thence to the next washer, substantially as described.

In testimony whereof I affix my signature in presence of two witnesses.

HIRAM W. GRAY.

Witnesses:
 W. T. MORRISON,
 C. M. MITCHELL.